US007921299B1

(12) United States Patent
Anantha et al.

(10) Patent No.: US 7,921,299 B1
(45) Date of Patent: Apr. 5, 2011

(54) PARTNER SANDBOXING IN A SHARED MULTI-TENANT BILLING SYSTEM

(75) Inventors: Anoop Anantha, Kirkland, WA (US); David J. Brennan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 10/729,515

(22) Filed: Dec. 5, 2003

(51) Int. Cl.
G06F 12/14 (2006.01)
G06F 21/00 (2006.01)
G06F 15/16 (2006.01)
H04N 7/16 (2006.01)

(52) U.S. Cl. .............. 713/187; 705/51; 709/201; 726/2; 726/28; 726/29

(58) Field of Classification Search .......................... None
See application file for complete search history.

(56) References Cited

U.S. PATENT DOCUMENTS

| | | | |
|---|---|---|---|
| 4,713,753 A * | 12/1987 | Boebert et al. | 711/164 |
| 5,335,346 A * | 8/1994 | Fabbio | 711/163 |
| 5,911,143 A | 6/1999 | Deinhart et al. | |
| 5,913,025 A * | 6/1999 | Higley et al. | 726/4 |
| 6,158,007 A | 12/2000 | Moreh et al. | 726/1 |
| 6,161,128 A * | 12/2000 | Smyk | 709/205 |
| 6,198,824 B1 * | 3/2001 | Shambroom | 380/279 |
| 6,233,618 B1 * | 5/2001 | Shannon | 709/229 |
| 6,272,469 B1 * | 8/2001 | Koritzinsky et al. | 705/2 |
| 6,289,458 B1 * | 9/2001 | Garg et al. | 726/21 |
| 6,330,598 B1 * | 12/2001 | Beckwith et al. | 709/223 |
| 6,412,070 B1 | 6/2002 | Van Dyke et al. | |
| 6,466,932 B1 | 10/2002 | Dennis et al. | |
| 6,502,103 B1 | 12/2002 | Frey et al. | |
| 6,594,671 B1 | 7/2003 | Aman et al. | |
| 6,640,097 B2 * | 10/2003 | Corrigan et al. | 455/414.1 |
| 6,751,657 B1 * | 6/2004 | Zothner | 709/220 |
| 7,096,491 B2 * | 8/2006 | Cheng | 726/4 |
| 7,113,994 B1 * | 9/2006 | Swift et al. | 709/229 |
| 7,146,635 B2 * | 12/2006 | Eggebraaten et al. | 726/4 |
| 7,418,426 B1 * | 8/2008 | Reunert et al. | 705/40 |
| 2003/0145094 A1 * | 7/2003 | Staamann et al. | 709/229 |

OTHER PUBLICATIONS

R.K. Thomas and R.S. Sandhu. Task-based Authorization Controls: A Family of Models for Active and Enterprise-oriented Authorization Management. In Proc. of the IFIP WG11.3 Workshop on Database Security, 1997. 16 pages.
Andrew Rowley. Dynamic Access Control for Shared Objects in Groupware Applications. ECOOP Workshops, 1998. 4 pages.

* cited by examiner

*Primary Examiner* — Nasser Moazzami
*Assistant Examiner* — Fatoumata Traore
(74) *Attorney, Agent, or Firm* — Shook, Hardy & Bacon LLP

(57) ABSTRACT

The present invention relates to a system and methodology for interacting with a Subscription Platform Service (SPS) and providing data security between entities that employ such service. The system includes a component that receives a request to access an object by an entity, and a data store that stores security information on classes of the objects. A verification component employs the security information to determine whether the entity has permission to call an Application Programming Interface (API) for the object and/or operate on the object, wherein the verification component exposes the object if permission exists or masks the object if permission does not exist.

28 Claims, 13 Drawing Sheets

US 7,921,299 B1

PARTNER SANDBOXING IN A SHARED MULTI-TENANT BILLING SYSTEM

TECHNICAL FIELD

The present invention relates generally to computer systems, and more particularly to a system and method for protecting access to shared data structures in a centralized billing system via a globalized security feature associated with an object class.

BACKGROUND OF THE INVENTION

Organizations that employ third-party service providers (application, network or otherwise) generally, should manage users and access rights across both their internal systems and the systems run by service providers. In some cases, provisioning systems can facilitate establishing new users' rights and privileges across multiple applications. Many provisioning systems include a workflow system, a logging and audit system, a database to support the workflow and auditing tasks, and personal agents that communicate with applications to add, delete, suspend or change users and privileges. Not all provisioning systems have equal spans of control and utility, however, wherein several problems currently exist.

At the core of many systems, custom-designed models and architectures have been developed to support existing businesses and/or business practices (e.g., an electronic accounting system that can only manage accounts relating to the associated business it was designed for). These models can include inflexible rules that are configured to one particular business model or a limited subset of business activity. Thus, inflexible or hard-coded designs are not easily adaptable to newer and ever-changing technologies such as provided by the Internet and/or other type electronic services. Consequently, if new services are to be added to existing businesses, or if new packages of services are desired, extensive systems, architectural improvements, and re-designs are generally required to support such services.

Another related problem involves the amount of development effort that is expended when new services become available and another entity that has not developed the service desires to sell the respective service or in some cases become aware of service availability. As an example, if a vendor of a music service were to add a subsequent service such as a retail merchandise service, it is very likely that the vendor would have to develop a custom and/or new interface to support existing billing and/or accounting practices that were previously in place for the original music service. As can be appreciated, if new interfaces, software, procedures and/or business practices are required when new services are added and deployed or in many cases when new relationships are established, then development time and associated costs can become excessive.

As technology migrates from a desktop centric world to a services based business, an increasing portion of revenue will be derived from billing customers and businesses for services they consume. In an online subscription business, for example, many tenants associated with the business also may be competitors with each other. Thus, these tenants generally desire to keep information about their customers confidential with respect to other tenants that may also utilize the business. From the tenant's perspective, they do not want their competition to be able to gain access to sensitive customer information or worse, allow the competitor to modify or delete such information. Therefore, protections should be in place to mitigate the possibilities of confidential data being accessed by unauthorized parties.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods that provide an architecture by which partners (e.g., tenants and service providers) employ an automated billing and provisioning system for creating/servicing/managing subscriptions while mitigating exposure of sensitive or confidential data between partners. In this manner, respective partners can utilize a full range of services offered by the billing and provisioning system in an autonomous manner by individual partners while such services can be concurrently accessed by a plurality of such partners. "Partner Sanboxing" provides a system and method for authorizing partners to facilitate that these entities receive full access to Application Programming Interfaces (API's) and/or objects for which there is a business need and partial or no access to other API's or business objects. This granular grant of rights is supported in an easily configurable, data driven manner.

A shared billing system or subscription platform can easily consist of several million or billions of "business objects" which in the case of a Subscription Platform Service (SPS) relates to customer accounts and subscriptions. In such cases, it is generally not efficient to maintain security information (e.g., via separate Access Control Lists or ACLs) along with each one of the various objects. Instead, a smart optimization process is provided for storing security information on one or more classes of objects that are employed by the service. Thus, each new object created automatically inherits default or determined security information related to its class. In some exceptions, it is possible to override the default security settings with higher or different security options with an explicit security grant for the object in question.

When a partner such as a tenant attempts to perform an operation on a business object, an automated check or determination can be performed to verify that the tenant in question is allowed to call an API attempting access to the business object. If the check or determination succeeds, another check or determination can be performed to facilitate that the tenant has suitable privileges to operate on the respective business object. If the tenant does not have suitable privileges, the object can be hidden from the tenant. In this manner, the tenant has the impression that it is the only partner on the entire system even though the system may support several partners concurrently.

The present invention also supports proxied tenant callers where an intermediate proxy can place calls into the SPS on behalf of another tenant but still gain access to the desired objects. Security principals for identifying partners can be platform neutral and stored in a backend databases for high performance access checks. Management of authorization information can also be achieved through a separate management portal, if desired.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
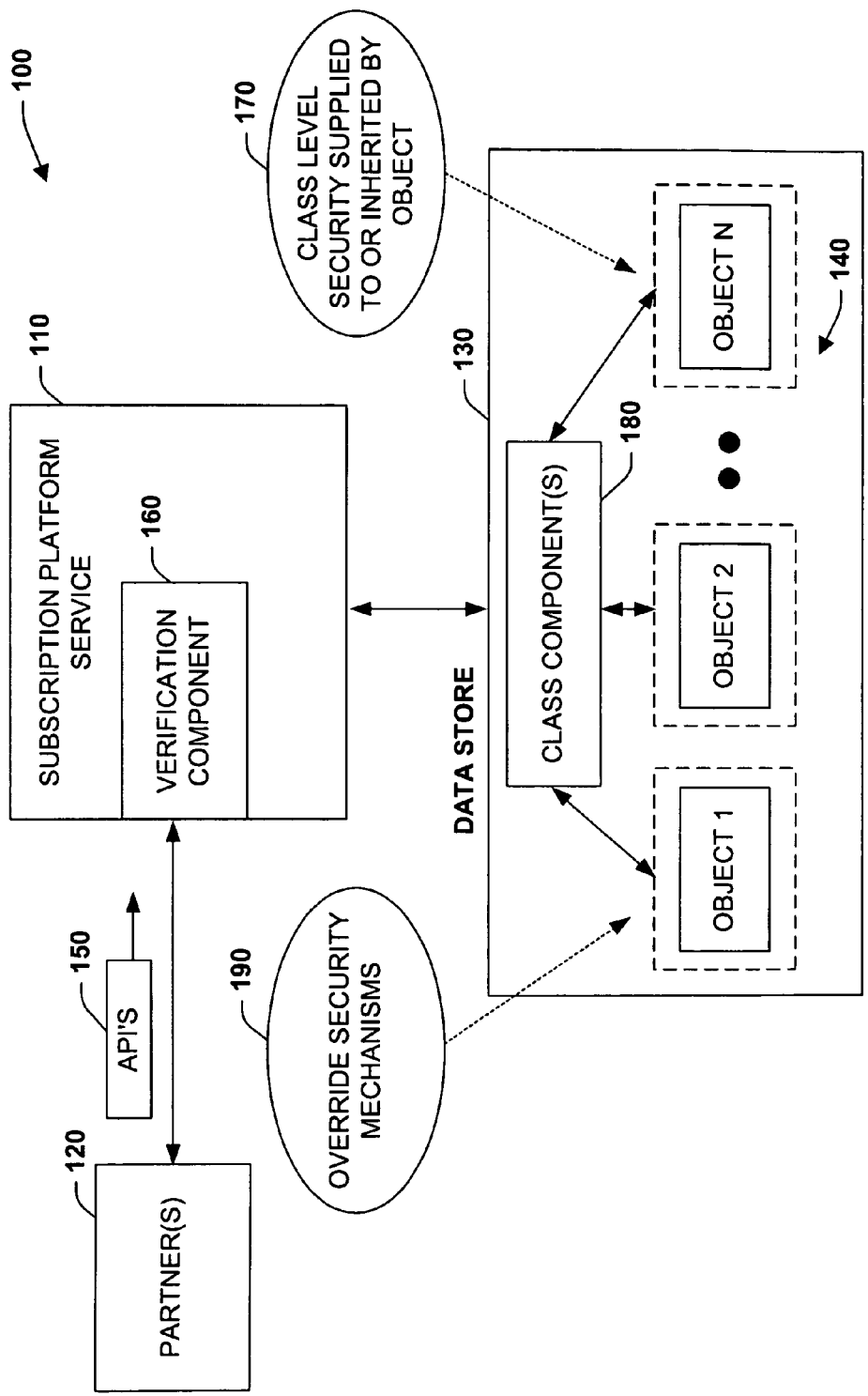
FIG. 1 is a schematic block diagram illustrating a subscription platform service and data security system in accordance with an aspect of the present invention.

The present invention relates to a system and methodology for interacting with a Subscription Platform Service (SPS) and providing data security between entities that employ such service. The Subscription Platform Service can be provided as a centralized platform supporting billing, provisioning, signup, data storage and/or supportability needs of several partners, for example. Such a shared platform model has several advantages, wherein partner data privacy and integrity should also be provided to mitigate unauthorized reading or modifying data belonging to another partner's users. Partner sandboxing is a feature that allows several partners to maintain their data in a virtual, isolated environment (i.e., sandbox) even though the data may be physically present in a shared data store. In this manner, one partner cannot intentionally or accidentally read or modify the data of another partner's users. Also, this feature saves on the additional cost of having separate billing systems for each partner in order to maintain security between partners.

In online subscription businesses, for example, a business entity providing subscription services may have partners (e.g., content/service providers), whereby the "partners" are competitors of each other. Partner sandboxing controls partner access to subscriber information (i.e., "objects") in a shared multi-partner billing system. It is generally not efficient to maintain security information (e.g., Access Control Lists, or ACLs) along with each respective object. Instead, security information can be stored on classes of objects. When a partner attempts to perform an operation on a business object, an automated verification can be performed to verify permissions to call an associated Application Programming Interface (API) and/or verify privileges to operate on the object. In one aspect of the present invention, a system is provided that facilitates access to a plurality of shared software objects by disparate entities. The system includes a component (e.g., SPS) that receives a request to access an object by an entity, and a data store that stores security information on classes of the objects. A verification component employs the security information to determine whether the entity has permission to call an API for the object and/or operate on the object, wherein the verification component exposes the object if permission exists or masks the object if permission does not exist.

As used in this application, the terms "component," "interface," "object," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring initially to FIG. 1, a data security system 100 and subscription platform service (SPS) 110 is illustrated in accordance with an aspect of the present invention. One or more partners 120 such as a tenant that sells services and/or a service provider that provides such services utilize the SPS for automated billing and provisioning services. For example, these services can include automated creation, maintenance, and access to billing accounts that record transactions by customers who receive services from the partners 120. The accounts are stored in a data store 130 (or data stores) that includes one or more objects 140 relating to the accounts. In order to create and access services of the SPS 110 and objects 140, one or more Application Programming Interfaces (API's) 150 are directed to the SPS. It is noted that access can be based on security information stored on the class of object being accessed or other objects related to this object such as deriving implied security permissions by using related objects. For example, a tenant may not be able to observe certain details about customer account object that exists in the system unless that customer has a related subscription objected that is owned by that tenant.

In one aspect of the present invention, it is desirable for the partners 120 to be able to access the SPS 110 and objects 140 in a manner whereby it appears to the partner that they are the only entity employing such services even though other entities or partners utilize common aspects of the system. In other words, data stored from one entity or partner via the objects 140 should be shielded or protected from activities from another entity or partner 120. This type of protection can be modeled as a security perimeter surrounding the objects 140 to mitigate unauthorized access to a respective partner's object or objects. This type of modeled security for respective objects 140 can also be referred to as a "Partner Sandbox." For example, if a first partner has access to an Object! and a second partner has access to Object$_2$, then neither partner should be allowed access the other partner's object that is protected by a security "sandbox" without suitable authorization from one of the partners. One manner for achieving security for the objects 140 is to employ an Access Control List (ACL) for each object. However, since the SPS 110 and associated data store 130 can support a plurality of objects, then creation and maintenance of the lists for each object can become inefficient in terms of data storage requirements and associated processing of the lists.

To mitigate ACL processing and storage, the present invention employs a multi-tiered security model. At one level, a verification component 160 is associated with the SPS to determine and verify whether or not a respective partner 120 should be allowed access to the objects 140 via the API's 150. The verification component 160 can perform checks (e.g., security credential checking, authentication, authorization) on the partner issuing the API 150 to determine whether the partner should be allowed access to the objects 140, wherein detailed examples of verification are described below. At another level of security depicted at reference numeral 170, the objects 140 when created, can inherit (or supplied to object by a component) a default or determined level of security from one or more class components 180. By inheriting security properties as object members of a respective class, creation and management of individual ACL's is mitigated. Since there may be circumstances whereby the partner 120 may desire additional or other security options, one or more override security mechanisms 190 may be provided to augment default security properties of the class component 180.

It is noted that the following discussion relating to FIGS. 2-10 describe particular example implementations of automated verification procedures and object security encapsulation techniques. However, it is to be appreciated that the present invention is not limited to the particular examples shown and thus, substantially any technique for providing multi-level security and/or providing object inheritance of security parameters as members of a class in the context of an automated billing and provisioning system are considered to be within the scope of the present invention. Before proceeding, the following terms may be employed as part of the discussion that follows:

Tenant—A group or 3$^{rd}$ party company that arranges for Subscriptions to be sold through SPS.

API Caller—Software that invokes methods from an SPS API set. Web services are specific type of API Caller; others may include a tool that invokes an SPS SPK described below.

Signup Caller—An API Caller that calls SPS APIs in a Signup API collection.

Account Manager Caller—An API Caller that calls SPS APIs in an Account Management API collection.

Customer Care Caller—An API Caller that calls SPS APIs in a Customer Care API collection.

CSF Tenant—A Tenant that employs a Centralized Signup Framework as its Signup Caller.

Proxied Tenant—A Tenant that relays its billing requests to a proxy server that translates those requests into SPS API Calls. The Proxy server may aggregate more than one Tenant.

Authentication—The process of determining an identity of a party, possibly through interrogation. Usually credentials of some type are involved.

Authorization—The process of deciding what a particular entity may do. Usually authorization follows authentication since without authentication it is generally not possible to determine who or what the entity is.

ACL—Access Control List. A operating subsystem (e.g., Windows) exposes ACLs upon data objects granting or restricting access to identities (e.g., NT identities). SPS exposes ACLs upon business objects granting or restricting access to API Callers API—An Application Programmable Interface. The SPS system exposes APIs for billing, provisioning, and offer modeling.

Billing Object—An SPS logical data structure that models some aspect of a Tenant's business. Billing Objects are defined at a level of abstraction above objects such as files and database tables.

BAM—The Billing and Accounts Manager website provides Account Management for Subscriptions purchased by customers.

SPK—The Billing Development Kit is a set of APIs exposed by the SPS as a web service. These APIs are used to sell, manage, and support online Subscriptions.

Bounty—Company strikes deals with 3$^{rd}$ party partners to sell company's services as a distribution channel. The 3$^{rd}$ party partners are paid a monetary bounty for each Subscription they bring in.

CSF—Centralized Signup Framework provides convenient signup user interface (UI) functionality for Tenants that do not author their own Signup Caller service.

CSR—Customer Service Representative organizations provide customer care for the customers of one or more Tenant businesses.

Offer—The representation of a business deal stored in SPS, expressing a set of services offered to the customer and the payment plan for those services.

Sandboxing—The process of securing Tenants from one another by restricting their access rights to include only those APIs and objects relevant to their own businesses. Properly sandboxed Tenants should not affect businesses of other Tenants through SPS.

SOAP—Simple Object Access Protocol is a syntax used by Web Services.

Subscription—A purchased copy of an Offer associated with a customer's account

IP Address—The declared point to which an Internet message is delivered or from which it originates.

Identity—An identity assigned to an Operating system process. (e.g., by a Windows NT SAM or Windows Active Directory). These identities are assigned based upon the presentation of credentials.

Web service—One or more servers exposed that communicate with HTTP-based SOAP requests, for example.

Wholesaler—A 3$^{rd}$ Party Tenant that arranges users to receive another company's services under its own brand and pays the company a pre-arranged fee for each Subscription.

Figure 2:
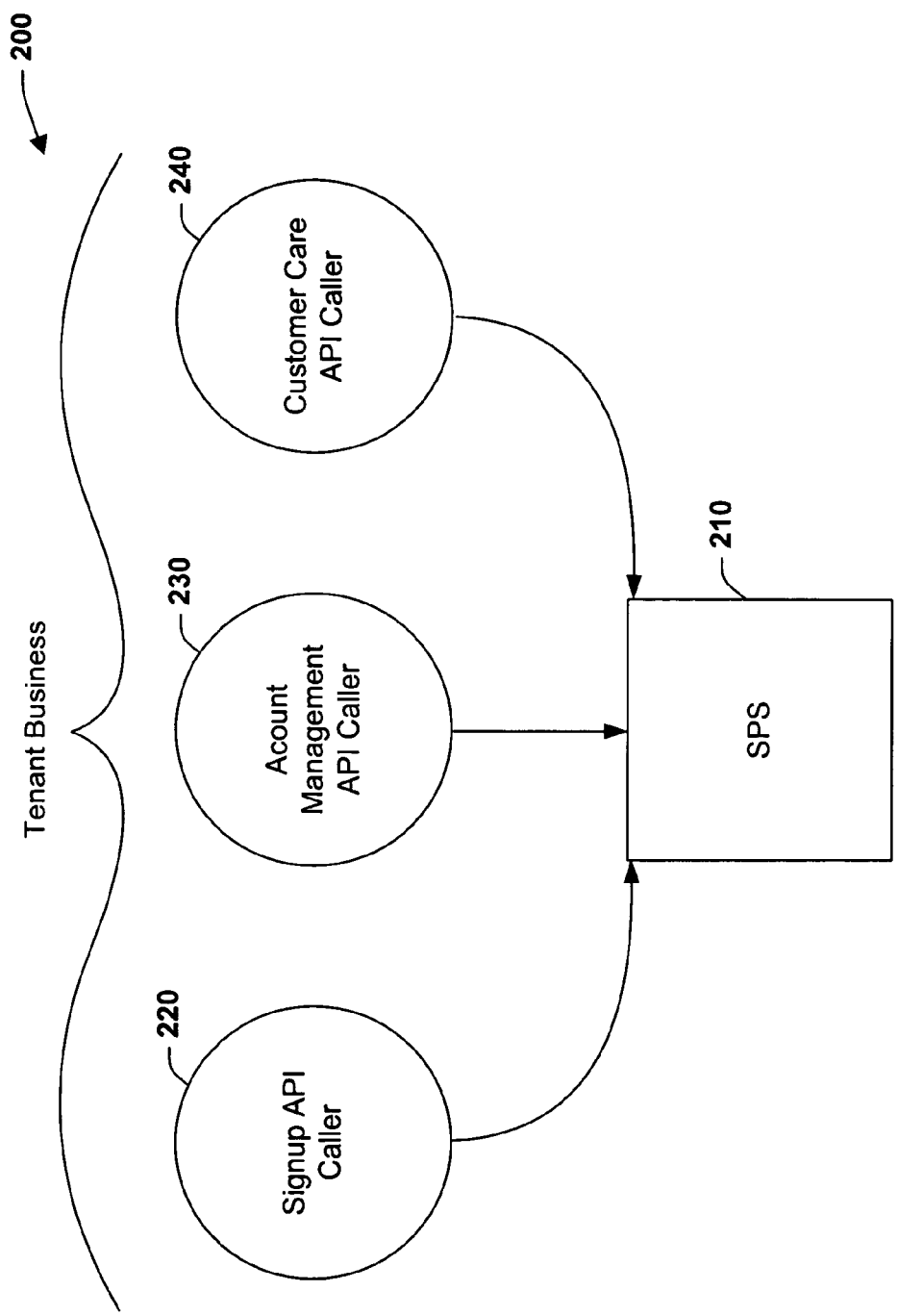
FIG. 2 is a diagram illustrating example tenant interactions with a subscription platform service in accordance with an aspect of the present invention.

Referring now to FIG. 2, a system 200 illustrates example tenant interactions with a subscription platform service 210 in accordance with an aspect of the present invention. The system 200 illustrates one particular classification of callers in a tenant business. It is to be appreciated that other classifications are possible. Tenants can designate between one and three API Callers (or more) to perform basic functions of Signup at 220, Account Management at 230, and Customer Care at 240 for their business. As described above, an API Caller is a web service that calls SPS APIs, wherein it is noted that a single API Caller can be granted more than one of these roles for a Tenant. Also, Tenants can identify a Centralized Signup as their Signup API Caller, BAM as their Account Management API Caller, for example, and another entity as their Customer Care API Caller, if desired. This can also be the case for default purchase $3^{rd}$ party offers. Wholesalers may desire to build their own Account Management and Customer Care API Callers. Associations between Tenants and their API Caller agents can be stored in a Tenant Agents Table (not shown). This table can be referenced when new objects are created in the system in order to apply suitable security measures.

Figure 3:
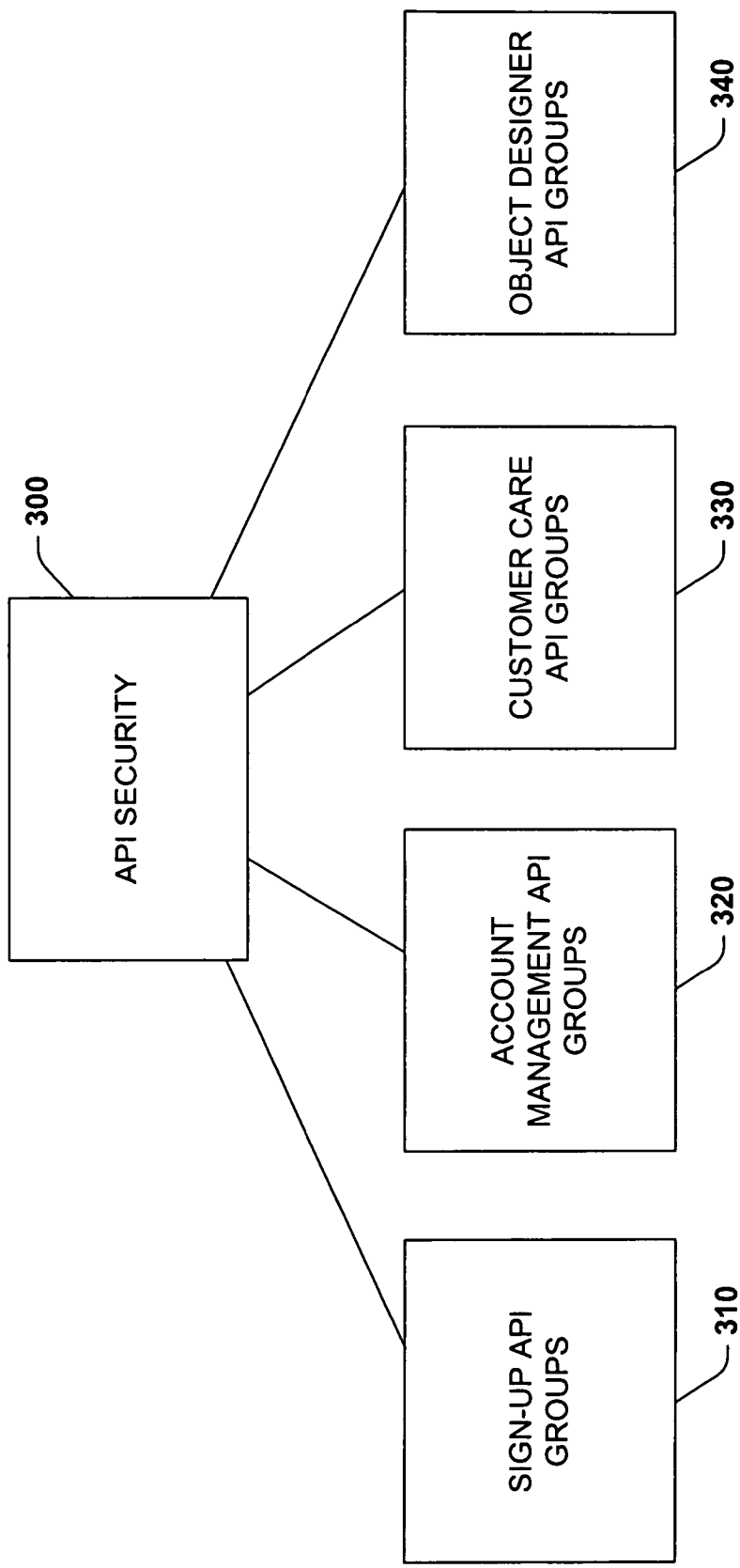
FIG. 3 is a diagram illustrating Application Programming Interface security aspects in accordance with an aspect of the present invention.

Turning to FIG. 3, Application Programming Interface security aspects 300 are illustrated in accordance with an aspect of the present invention. A Subscription Platform Service can expose a number of application programmable interfaces (APIs) 300 known collectively as a Billing Development Kit or SPK. These APIs perform a variety of manipulations upon SPS business data. For example, a CreateAccount API creates a new user account in the system, and an AdjustLineItem API grants a financial adjustment to a historical line item. Authorization in accordance with the present invention restricts the ability to call APIs as a first line of defense against malicious or malfunctioning API Callers. As client SOAP commands arrive, the SPK application can authorize the requested action using a combination of NT identity (or other type) and API name. If the caller is not authorized to make such an API call, then the SPK can return an error.

Object Sandboxing described below provides suitable security even without API security. A malicious Tenant should be able to call any API freely without risk of damaging another Tenant's business. However, restricting the ability to call APIs has some advantages:

1. Object Design security. SPS business objects such as Offers are shared between multiple Tenants, and the authority to modify or update them ultimately stems from the credentials presented by a business operations user through point of presence (POP) connection. Therefore, the objects themselves may not be protected, although the APIs are.
2. Defense in depth. Enforcing authorization at two points (or more) in a call stack rather than one reduces the likelihood of a rogue call slipping through as a result of faulty code, for example.
3. Performance. By rejecting API requests that a Tenant cannot possibly execute successfully, SPS spares itself resources and database trips, and returns an error code to the Tenant promptly. This can also be construed as a security advantage as it reduces the damage from a concerted attack.
4. Clarity for Tenants. Membership in simple, well-defined roles can assist Tenant developers and testers in understanding what calls they can expect SPS to allow.

API Callers depicted above in FIG. 2, can be granted access to individual APIs in an API Authorization Table, but a Partner On-boarding utility simplifies this process by grouping APIs by function. When a new API Caller is modeled, it is granted access to the APIs in one or more of these API groups. The APIs in those groups are then added to the Caller API table for that API Caller. The following section describes the API Groups according to their function. An API Caller may be granted access to any or all of these groups or others that are not shown.

At 310, Signup API Groups contain APIs related to creating new Accounts in the system and selling Subscriptions. This group may include one or more of the following APIs:

ManageAccounts Group

This group contains APIs that locate and update existing accounts, and create new ones. Granting an API Caller the ManageAccounts Group will authorize it to call:
    GetAccountEDFromAdminPUED
    GetAccountInfo
    GetKey
    CreateAccount
    UpdateAccountInfo SellSubscriptions Group This group contains APIs that determine offerings and purchase them for a user. Granting an API Caller the SellSubscriptions Group will authorize it to call:
    GetBaseOfferings
    GetEligibleOfferings
    PurchaseOffering
    ValidateProvisioningData
    ProvisionServices
    DeprovisionServices
    CheckProvisioningStatus ManageRoles Group This group contains APIs that manage user access to services. Granting an API Caller the ManageRoles Group will authorize it to call:
    GetPermitsForObjectED
    GetPermitsforPUED
    SyncUPSCacheForPUID
    AddRoleAssignment
    RemoveRoleAssignment Convert Group This group contains APIs that convert one subscription to another and manage the conversion process. Granting an API Caller the Convert Group will authorize it to call:
    ConvertSubscription
    CompleteConversion
    CancelConversion ManageResources Group This group contains APIs that determine and modify resource balances. Granting an API Caller the ManageResources Group will authorize it to call:
    AdjustResourceBalance
    GetResourceBalances
    ReportUsageEvent At 320, Account Management API Groups include APIs related to customer self-service. This group may include one or more of the following APIs:

ManageSubscriptions

Figure 4:
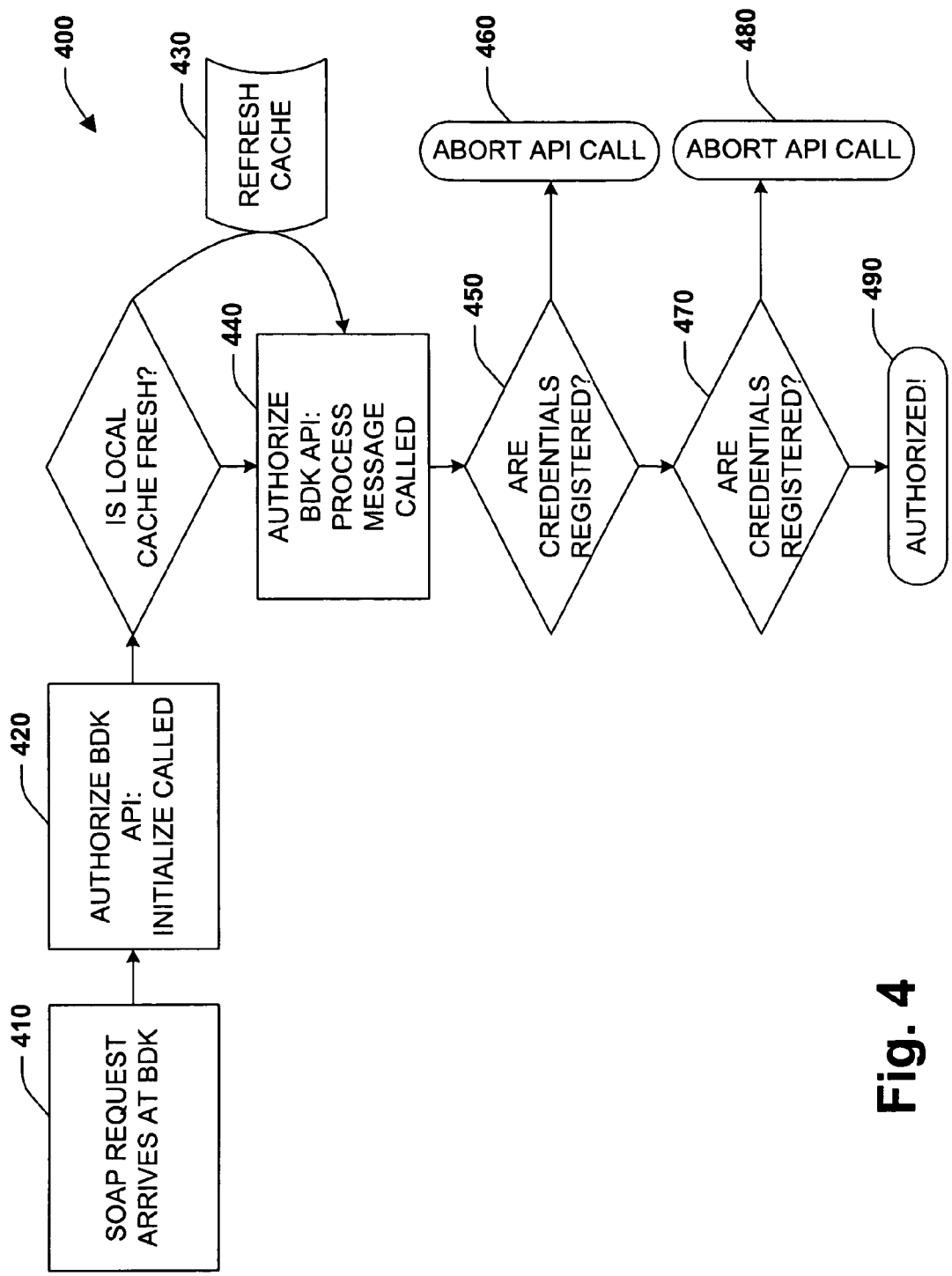
FIG. 4 is a flow diagram illustrating an example authorization process in accordance with an aspect of the present invention.

This group contains APIs that view subscription sets, and manage subscription status. Granting an API Caller the ManageSubscriptions Group will authorize it to call:
    GetSubscriptions
    GetSubscriptionStatus
    GetServiceComponents
    UpdateSubscriptionInfo
    CancelSubscription
    ReinstateSubscription ChangePayments This group includes APIs that manage outstanding balances. Granting an API Caller the ChangePayments Group will authorize it to call:

StopPayments
TransferBalance
CloseBalance
SettleBalance
ModifyPaymentInstruments
This group contains APIs that modify payment instruments on an Account. Granting an API Caller the ModifyPaymentInstruments Group will authorize it to call:
GetKey
RemovePaymentInstruments
SwitchPaymentInstruments
UpdatePaymentInstrumentInfo
GetPaymentInstruments
AddPaymentInstrument
LookupHistory
This group contains APIs that look up billing and provisioning history on an account. Granting an API Caller the LookupHistory Group will authorize it to call:
GetAccountActivity
GetBillingPeriods
At 330, Customer Care API Groups include APIs related to customer self-service. This group may include one or more of the following APIs:
Comment
This group includes APIs that add to or view a CSR comments collection on an Account. Granting an API Caller the Comment Group will authorize it to call:
AddComment
GetComments
GetReferralData
CompensateUser
This group contains APIs that provide a user adjustments, offsets, or monetary credits. Granting an API Caller the CompensateUser Group will authorize it to call:
CreditPaymentInstrument
AdjustResourceBalance
AdjustSubscription
GetAdjustments
OffsetLineItem
ManageBanList This group includes APIs that get and set contents of a banned entities lists. Granting an API Caller the ManageBanList Group will authorize it to call:
BanPaymentInstrument
IsPaymentInstrumentBanned
UnbanPaymentInstrument
BanUser
UnbanUser
MatchAccounts
This group contains APIs that perform deep or costly search algorithms used in CSR scenarios. Granting an API Caller the MatchAccounts Group will authorize it to call:
GetAccountIDFromPaymentInstrumentInfo
SearchAccounts
UpdateSubscriptionStatusFromPaymentInstrument
MatchPaymentInstruments
ManageStatus
This group contains APIs that modify or view status of an account, including violations. Granting an API Caller the ManageStatus Group will authorize it to call:
GetAccountStatus
ActivateAccount
AddViolation
RemoveViolation
CloseAccount At 340, Object Designer API Groups contain APIs related to adding or modifying SPS business objects, including offers and new API Callers. This group may include one or more of the following APIs:
ManageObjects
This group includes APIs that modify or view SPS business objects, including Offers and API Callers. Granting an API Caller the ManageObjects Group will authorize it to call:
GetObject
SetObject
RemoveObject
EnumerateObject FIG. 4 illustrates an example authorization process in accordance with the present invention. While, for purposes of simplicity of explanation, the methodology may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Before proceeding with a detailed discussion of FIG. 4, various API security enforcement aspects are described. Enforcement of API authorization can occur in the SPK as requests arrive and execute before control is handed from a (e.g., ASP.NET) process to the SPK caller methods. One purpose of enforcing API security at an early stage rater than in each API method is to mitigate errors by enforcing API security by default. Thus, developers do not have to perform extra work in order to provide security with new APIs. An SPK application can run as a Domain Guest user, SPSSPKAccount. This account should be granted access to underlying stored procedures in SPS. Incoming calls to the SPK generally will not be impersonated. Instead, HS can authenticate the caller without impersonation and the caller's requests can be fulfilled in the context of the SPSSPKAccount. The SPK can define a class derived from a SOAPExtension named AuthorizeSPK in a web.config file such as the following example:
<configuration>
  <system.web>
    <webServices>
      <soapExtensionTypes>
        <add type="AuthorizeSPKAPI, authzSPK" Priority="0" Group="0"/>
      <soapExtensionTypes>
    <webServices>
  <system.web>
<configuration>

An AuthorizeSPKAPI class can override SOAPExtension methods such as:
Initialize This method is called automatically by ASP.Net when AuthorizeSPKAPI is invoked at the beginning of a new API call. The method checks whether the object has a cached copy of Identity and API authorization information. If it does not have a locally cached copy, or if its copy is more than five minutes old (or other predetermined time), it will retrieve the Identity and API Authorization tables from the database, process the associated contents, and cache them in a data member.
ProcessMessage This method is called at the SOAPMessageStages. The method can process an AfterDeserialize stage utilizing the logic defined below. It can exit without processing for other SOAPMessageStages.

FIG. 4 depicts a Partner API authorization 400 as follows: At 410, a SOAP request arrives requesting a specific SPK API. At 420, an ASP.NET application (or other type) fires an AuthorizeSPKAPI.Initialize method. This event fires after an HTTP request arrives, but before processing is performed on the request. An Initialize method refreshes its local API Role data cache at 430 if it is absent or more than five minutes old (or other predetermined time). At 440, the ASP.NET application fires an AuthorizeSPKAPI.ProcessMessage method for AfterDeserialize. The ProcessMessage collects information about the call such as the caller's NT name from HTTPContext.User and the requested API from SOAPMessage.MethodName. At 450, ProcessMessage matches the information against its local cache of Authorization data. If there is no such NT name (or other type verification), then create an error of type SPK_BAD_CREDENTIALS and abort further processing at 460. At 470, if the NT name is listed in an Identity table, but the corresponding API Caller is not allowed to call the requested API, then create an error of type SPK_API_NOT_AUTHORIZED and abort further processing at 480. Otherwise, ProcessMessage exits with an implicitly successful authorization at 480.

Figure 5:
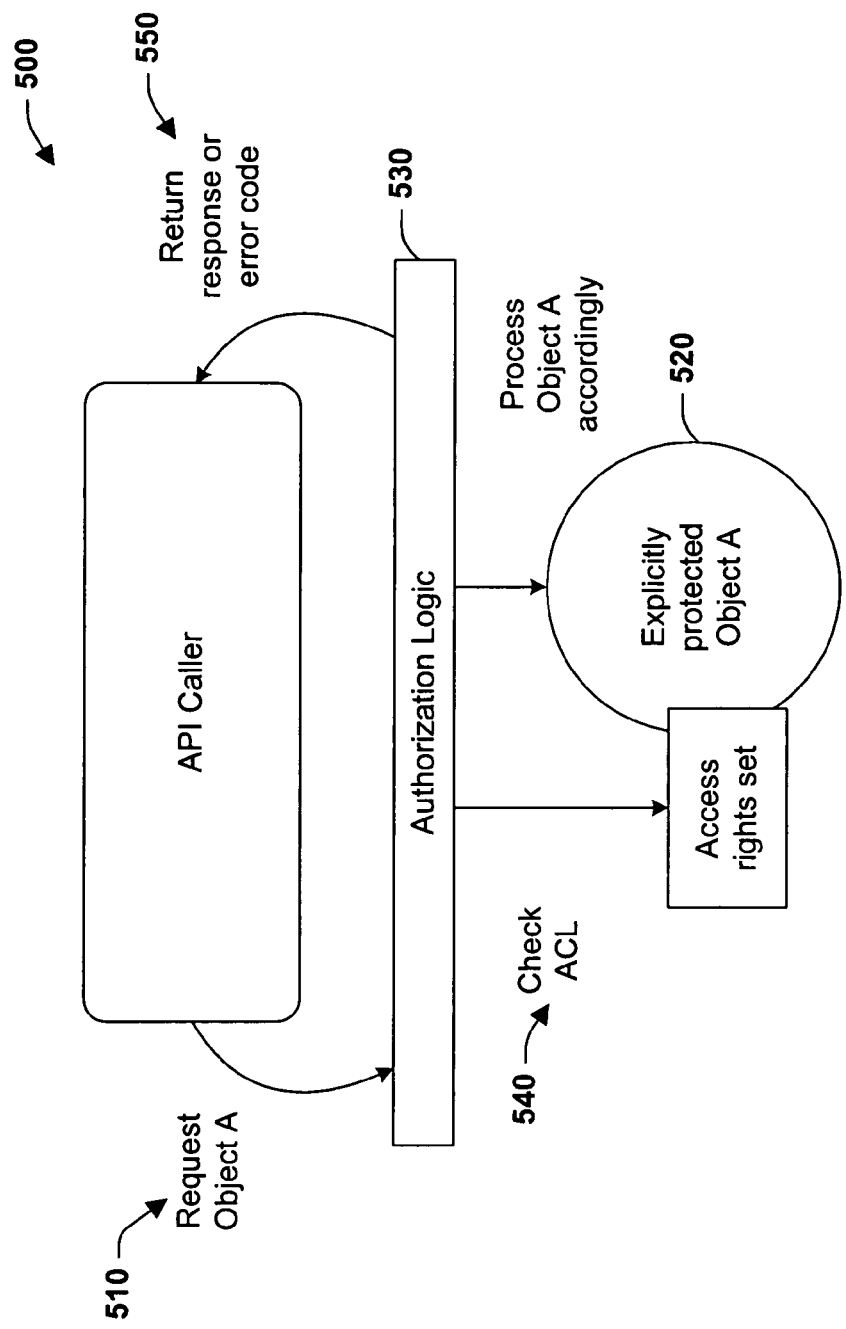
FIG. 5 is a block diagram illustrating explicit object protections in accordance with an aspect of the present invention.

FIG. 5 illustrates explicit object protections 500 in accordance with an aspect of the present invention. At 510, an API caller requests an object 520. Authorization logic 530 performs an ACL check on the API at 540 to determine if the requestor should be granted access to the object at 520. If not, an error code is returned at 550. Otherwise, access is granted to the object 520 and a non-error response is returned to the API caller at 550. In general, a business object ACL in SPS is a simple list of pairs. Each pair names the GUID of an API Caller or an API Caller group, and a right that is granted to that caller or group. Business object ACLs are typically indexed by the business objects themselves.

In general, the Authorization model supports the following object-level rights in order to minimize security descriptor overhead:
1. Access—This right allows basic access related to selling and managing Subscriptions.
2. Support—This right allows CSR access that should be restricted to Customer Service Reps. Granting support rights to an API Caller implicitly grants Access right as well.

Sandboxing security can be implemented at the SPS business object level, wherein objects requiring explicit protection can list a set of access rights granted to specific API Callers. As noted above, storing an ACL on every subscription in the system can be costly in terms of disk space, and impedes changing large numbers of ACLs swiftly. Moreover, Subscription ACLs are highly uniform in the common case, since most subscriptions are sold directly by a supplier company. As an optimization, SPS can define default Subscription ACLs, indexed by Offer. If a Subscription does not have an ACL stored locally, then the default Subscription ACL for that offer can be processed as the active ACL. This does not alter the security of Subscriptions, however. A difference is that the Subscription's explicit ACL is stored centrally or in a global manner and is thus referenced by more than one Subscription.

Figure 6:
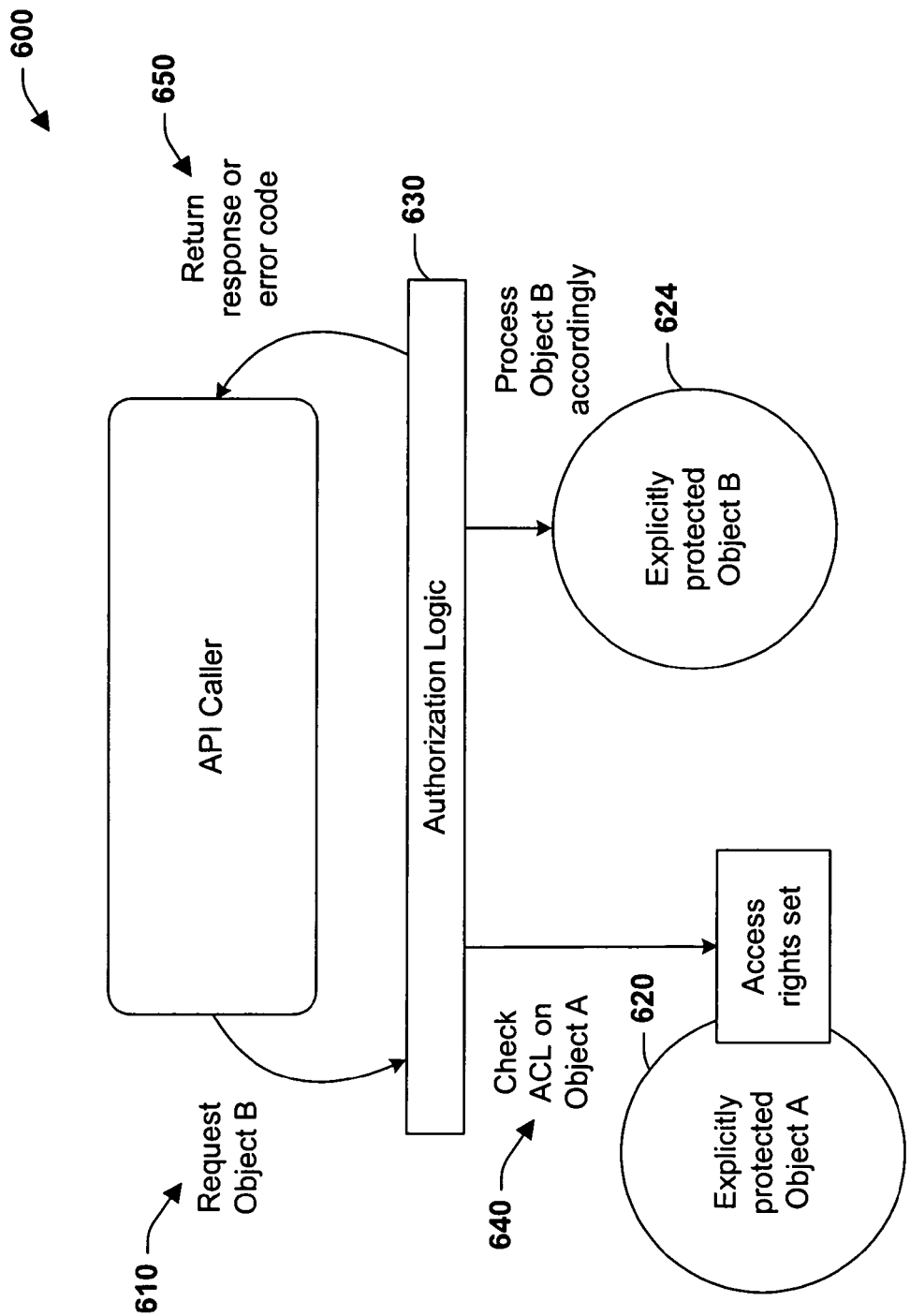
FIG. 6 is a block diagram illustrating implicit object protections in accordance with an aspect of the present invention.

FIG. 6 illustrates implicit object protections 600 in accordance with an aspect of the present invention. Similar to FIG. 5 above and proceeding to 610, an API caller requests an object 620 or object 624. Authorization logic 630 performs an ACL check on the API at 640 to determine if the requestor should be granted access to the object at 620 or 624. If not, an error code is returned at 650. Otherwise, access is granted to the object 620 or 624 and a non-error response is returned to the API caller at 650. As illustrated, some business objects are not protected by explicit lists of access rights. Thus, SPS provides security for these objects implicitly at 624 by referencing explicit security data supplied for other objects such as the object 620. Implicit security can be employed in situations where explicit security would lead to ACL proliferation.

Results from APIs related to Account details should be filtered based upon the implicit security on that account. These APIs (GetAccountInfo, GetAccountIDFromAdminPUID, and GetAccountEDFromPaymentInstrumentInfo) are designed to return billable information on an account, including some information that could be construed as private. However in order to support up-sell and cross-sell, all Tenants should have the ability to locate Accounts and see their basic status regardless of their prior relationship with the customer. The results from these APIs can depend upon the subscriptions on the target account. An API Caller that does not have the Access or Support right on a dependent subscription should only see summary details on the account, regardless of whether the API Caller specifies the bFullData flag in the call.

Figure 7:
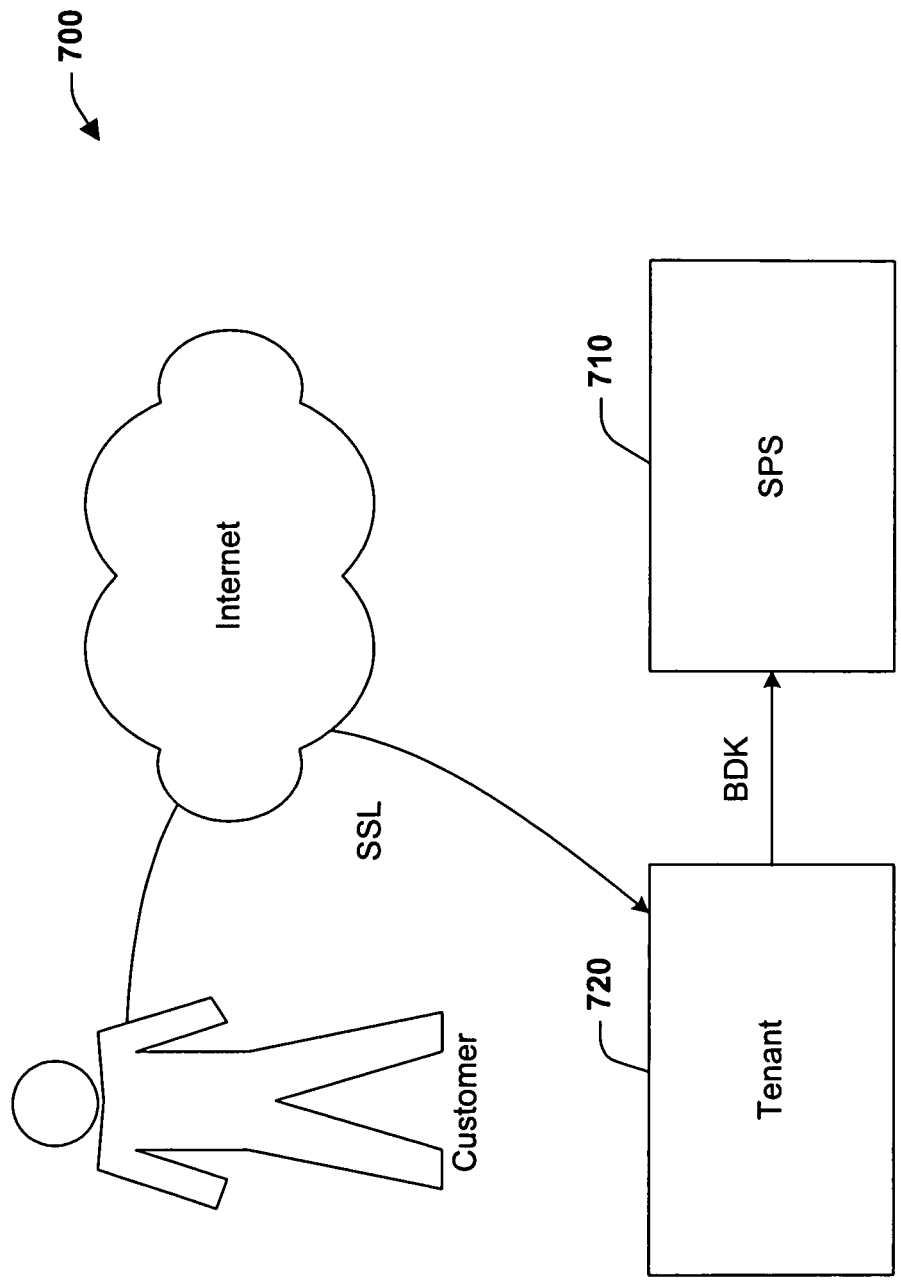
FIG. 7 is a diagram illustrating an example single-tenant interaction in accordance with an aspect of the present invention.

In particular, information provided to an API caller without these rights will be limited to:
Account Id
Account Friendly Name
Account Status, including Violation Set FIG. 7 illustrates an example single-tenant interaction 700 in accordance with an aspect of the present invention. In general, SPS 710 receives PurchaseOffering calls from a Signup API Callers. If only one Tenant 720 uses that API Caller as its Signup agent, it is straightforward to decide how to secure the resulting Subscription. Offers are usually not tied to a Tenant 720, however. As a result, multiple Tenants may purchase the same Offer when the services they provide to customers are substantially the same. The right to view and purchase a typical Offer by API Callers is:

Access: By Default, API Callers are granted the Access right on a new offer, provided that payment instrument restrictions are met. However, it is possible to override this default behavior.

When an Offer is purchased, a Subscription is created and related to an original offer. The resulting Subscription is visible to SPS Tenants, and visible by an Account Management team associated with the Tenant that purchased the Offer:

Access: When an Offer is purchased in a standard transaction, access rights are granted dynamically to the Signup API Caller and the Customer Care API Caller associated with the Tenant that made the purchase.

Support: When an Offer is purchased in a standard transaction, the Support right is granted to the Customer Care API Caller associated with the Tenant that made the purchase.

Figure 8:
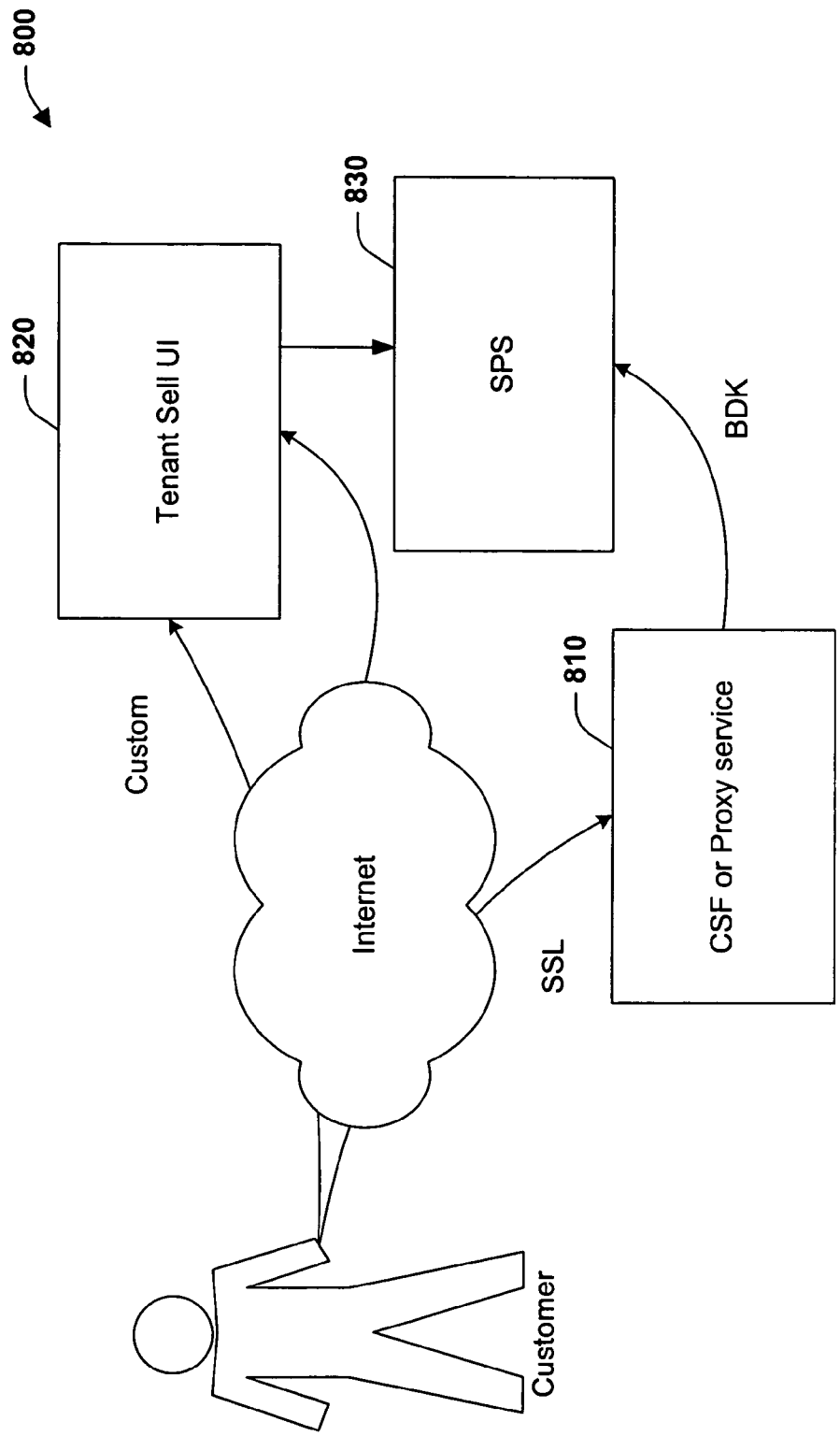
FIG. 8 is a diagram illustrating is an example of multi-tenant interactions in accordance with an aspect of the present invention.

FIG. 8 illustrates an example multi-tenant interaction 800 in accordance with an aspect of the present invention. Tenants are encouraged to use a Centralized Signup Framework 810 rather than build their own signup UI and Signup API Caller 820. This avoids duplicated development work, and reduces the number of services that have access to user personal information and payment instruments. Tenants using the CSF 810 can forward their users to a centralized signup URL, and the CSF can purchase the indicated offer for the user. Proxied purchases are a slight variation on CSF purchases. Third party companies that do not desire to build their own dedicated Signup API Caller can strike a deal with another service to proxy their purchase requests. In general, CSF and Proxy Tenants do not purchase Offers in their own right. Instead, they indicate the referring Tenant, and SPS 830 secures the resulting Subscription for that Tenant. When the purchase is complete, the Subscription and associated Payment Instrument can be treated as though they had been purchased by a dedicated Signup API Caller.

A Tenant Agents Table (not shown) allows multiple Tenants to name the same API Caller for one of their agent roles. For example, two $3^{rd}$-Party Tenants could name the same Signup API Caller server to perform their signup work. However, since those two Tenants may not use the same Account Management and Customer Care API Callers, it is desirable for CSF and other Proxy Signup API Callers to know the identity of the Tenant they are proxying and create Subscriptions with the appropriate ACLs. The PurchaseOffering and ConvertSubscription APIs can be overloaded to support a Purchase On Behalf of a named Tenant. When Signup API Callers purchase an Offer On Behalf of a Tenant, the derived Subscription can be processed as though it had been purchased by an agent of that Tenant. Signup API Callers may purchase an Offer On Behalf of a Tenant provided that:
1. They have been named as the Signup API Caller agent for that Tenant.
2. They are themselves permitted to purchase the Offer.

A Purchase On Behalf schema overloads a bstrReferralSetXML that is a component of PurchaseOffering, but does not change the schema signature. The bstrReferralSetXML can be added to ConvertSubscription. The following is an example of a Purchase On Behalf request to purchase an MSN9 Offer for an example wireline tenant:

<Referral>
  <ReferralType>MSN9</ReferralType>
  <PartnerED>ExampleWirelineTenant</PartnerID>
  <ReferraEData>
    <ReferralID xmlns="urn:schemas-company-com:Msnia">
      <BSTRCategory>msn9 broadband</BSTRCategory>
      <InsertDate>10/1/2003</InsertDate>
      <BrandingED>Example</BrandingID>
    </ReferralID>
  </ReferralData>
</Referral>

Figure 9:
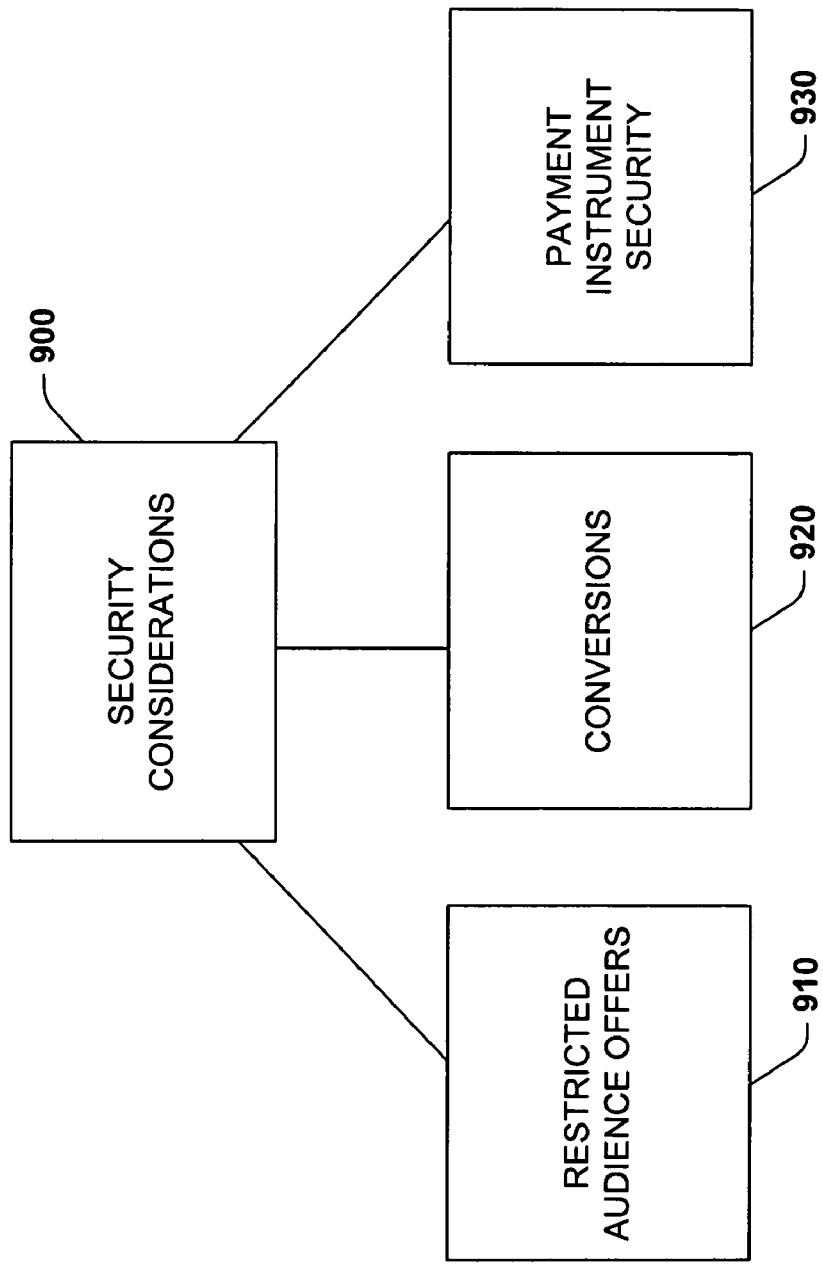
FIG. 9 is a diagram illustrating other security aspects in accordance with an aspect of the present invention.

FIG. 9 illustrates one or more other security considerations 900 in accordance with an aspect of the present invention. At 910, Restricted Audience Offers are considered. In general, regular offers may be purchased by an API Caller with sufficient API access rights. Offers are typically secured by an ACL granting the Access right to a special GUID signifying "Everyone." Some Offers can only be purchased by a restricted set of Signup API Callers. The decision to restrict an Offer is usually for the group modeling the offer. Restricted Offers can be used to model deals that:

Carry an immediate financial outlay. For example, cash rebate offers.

Involve a free term of service that is not offered to all customers of the service. For example, a six-months free offer if the user purchases through designated supplier.

Gratis offers given to VIPs. For example, an Executive Plan.

Restricted Audience Offers have an explicit list of Tenants that may purchase the Offer:

Access: Only an explicit set of Signup API Callers, are granted this right for Restricted Audience Offers.

Although the ability to purchase or convert to a Restricted Audience Offer is limited, the resulting Subscription has no more restrictions than a typical Subscription purchased by an exclusive Signup agent.

At 920, conversions are employed to transfer a user from one Offer bundle to another without requiring the user to cancel his or her existing subscription. When a conversion path between two subscriptions is defined, an API Caller with access to a ConvertSubscription API may request to convert subscriptions of the first type into subscriptions of the second type. This could conceivably lead to theft of business between wholesale providers, a practice known in the Telcom industry as "slamming." SPS can protect against slamming with a restriction upon subscription conversion: API Callers may only convert a subscription if they EITHER have the right to Support the Payment Instrument type used by the original Subscription OR if the Subscription is in the Expired state.

At 930, Payment Instrument Security is considered. Offers can also be restricted by payment instrument type. There are generally three options to pay for a Subscription:

Common Cash Instruments—Common cash instruments are issued by banks and may include Visa cards, American express cards, debit accounts, endorsed check cards and so on.

Wholesale Instruments—Wholesale instruments are markers issued by $3^{rd}$-party Wholesaler Tenants any may include phone numbers or customer tracking numbers.

Consumable Tokens—Tokens are not modeled as payment instruments. Instead they are vouchers tied to an Offer and redeemed by customers for service.

Offers may restrict their sale to appropriate payment instruments. For example, there may be a wholesale-only version of an offer. When verifying that the API Caller may purchase an Offer, the Access right on the Offer and an appropriate payment instrument for the Offer can be required. Tenants are granted access to specific Payment Instrument types during on-boarding and/or Payment Instrument modeling. Access by a Tenant to a Payment Instrument type is granted in a Tenant Payment Instrument Table.

Figure 10:
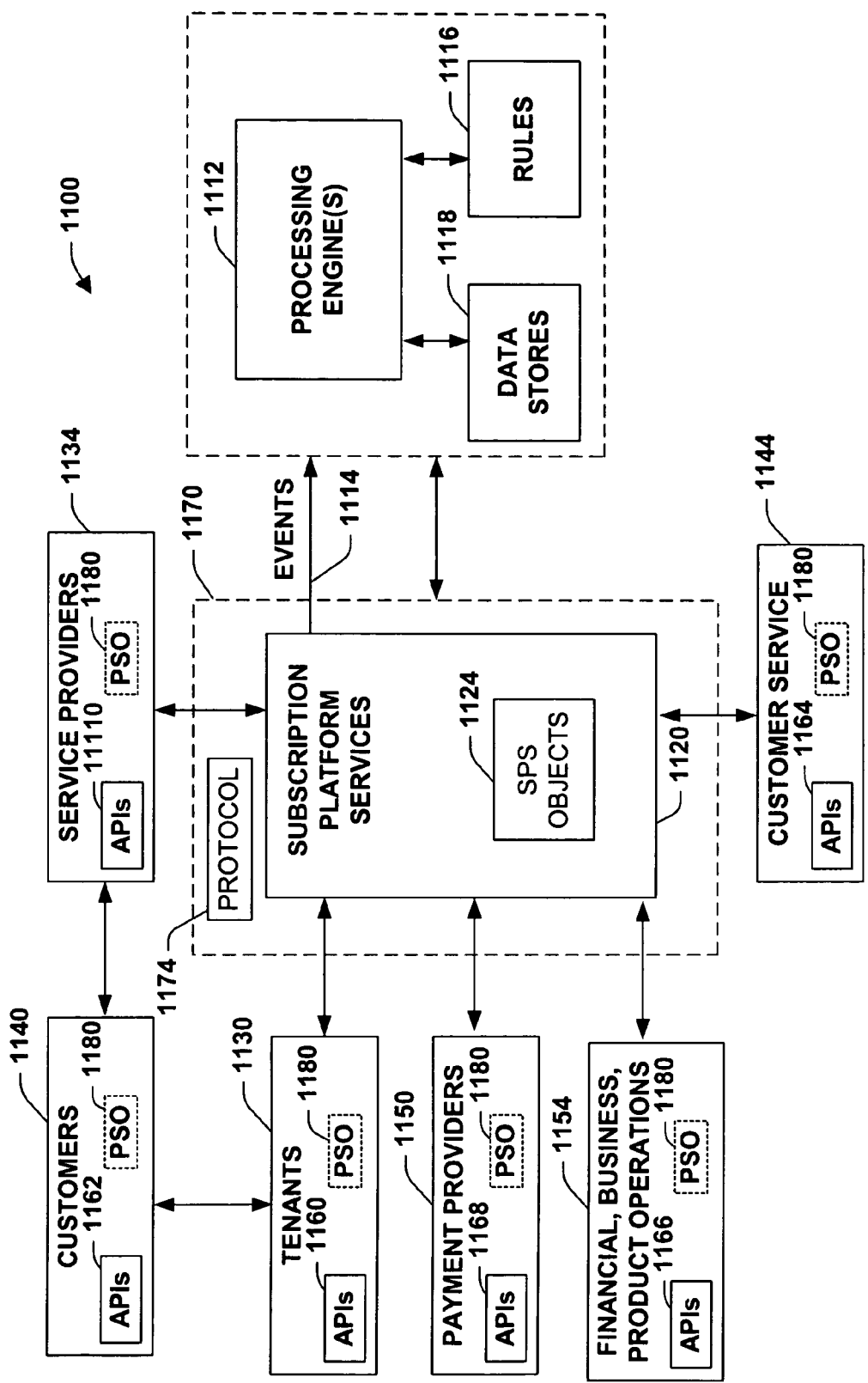
FIG. 10 is a schematic block diagram illustrating a billing and provisioning processing architecture in a distributed computing environment in accordance with an aspect of the present invention.

Referring now to FIG. 10, a system 1100 illustrates a billing and provisioning processing architecture in a distributed computing environment in accordance with an aspect of the present invention. The system 1100 provides an infrastructure to support various billing relationships between parties and entities. One or more processing engines 1112 are provided that respond to external billing and provisioning events 1114 and operate according to a plurality of rules 1116 that are associated with a respective processing engine 1112. The events 1114 can include internally determined events (not shown) within the processing engines 1112 and generally conform to a subscription event model. The model represents state transitions that a subscription may pass through in a subscription lifecycle (e.g., subscription for online services such as e-mail). An example of such events 1114 can include: Subscription Pre-Purchase, Subscription Purchase, Subscription Sponsorship, Subscription Cancel, Subscription Disable, Subscription Enable, Subscription Convert Out Of, Subscription Convert Into, Subscription Renewal, Subscription Usage Event Report, Subscription To Expire, User Service Profile Change, Subscription Expiration, Service Allocation, Service De-allocation, Service Suspension, and Service Enable. It is to be appreciated that other such events can be defined in accordance with the present invention.

The rules 1116 can include service delivery rules, qualification rules, rating rules, and/or other type rules that facilitate billing and provisioning processing in accordance with the processing engines 1112. Depending on the nature of the events 1114, the processing engines 1112 apply a set or subset of the rules 1116 that are associated with the events. For example, service delivery rules define atomic units of service to be delivered that include data about the type of service, service level delivery, and/or associated resource balance relating to performance and payment of a service. Qualification rules define eligibility requirements for purchase of a respective service. These rules can be created to restrict and/or alter purchasing of services to a limited set of users, user languages, currencies, countries, tenants, service providers, existing services and/or offerings owned, affiliation with a particular tenant, payment via a particular method, and so forth. Rating rules facilitate determining balance impacts to currency balances that result in charges and/or include noncurrencies that monitor consumption and allocation of services. These rules can be defined within the scope of an individual offering to be processed in the context of the subscription event model, described above. As will be described in more detail below, one or more data stores 1118 are provided to support billing and provisioning within the system 1110 and related subscription/event processing by the processing engines 1112.

A Subscription Platform Service (SPS) 1120 is provided that includes one or more Subscription Platform Objects (SPO) 1124 in order to establish and maintain billing, provisioning, and account relationships between one or more tenants 1130, one or more service providers 1134 and one or more customers 1140. In general, the tenants 1130 sell services that are performed by the service providers 1134 to the customers 1140, wherein the SPS 1120 is employed to create and manage a respective billing account for such services. The tenant 1130 offers a service or package of services (related or unrelated) to the customer 1140 or consumer of the services. An offering can include an atomic unit of salable items associated with a service in the system 1110. Offerings can contain collections of service delivery, qualification, and rating rules, plus multiple language and pricing descriptions for respective eligible languages, and include additional meta-data employed by the system 1110. Subscriptions provide an instance of an offering that is associated with a respective end user or customer 1140.

If a subscription for the service is desired, the tenant 1130 retrieves credit card information or other type of billing arrangement from the customer 1140, exchanges legal or contract information with the customer, and determines an amount to charge the customer on a regular or periodic basis for the service or services. The tenant 1130 employs the SPS 1120 to create a billing account, authorize the customer's credit card or other instrument with an associated financial institution, and notifies the service provider 1134 to begin offering services to the customer 1140. As services are performed by the service provider 1134, the SPS 1120 bills the customer's account. It is to be appreciated that other components illustrated in the system 1110 can offer or sell services to the customer 1140 in accordance with the present invention. For example, the service provider 1134 can offer and sell services to the customer 1140 without interacting with a respective tenant 1130.

Other parties or entities that are involved with the SPS 1120 include customer service components at 1144 to provide ongoing support and management of customer accounts. Payment providers at 1150 (e.g., banks, financial institutions) facilitate payment of customer accounts, whereas financial, business, and product operations aspects are illustrated at 1154. Financial and business operations can employ the SPS 1120 for data manipulation and analysis, if desired, whereas product operations can utilize the SPS to determine and provide product catalog offerings such as with packaged services, for example.

In accordance with one aspect of the present invention, an Application Program Interface set (API) 1160-1170 is provided, wherein the respective entities 1130-1154 can interact with the SPS 1120. The API set 1160-1170 generally performs as an interface to the SPS 1120. It is through the API set 1160-1170 that tenants 1130, service providers 1134, customers 1140, customer service representatives 1144, payment providers 1150 and/or financial/other operations 1154 access one or more features of the subscription platform service 1120. For example, the API set 1160-1170 can expose one or more of the following aspects such as Account Management, Product Catalog Search and Manipulation, Subscription Management, User Authorization, Usage events, Online Statements/Self-Care, Customer Service Utilities, Business and Product Operations, Utilities, Events and Notifications, and/or Provisioning Support.

An Extensible Markup Language (XML) schema can be provided that defines the platform objects 1124 for provisioning, billing and/or customer care. For example, the objects 1124 can include Accounts, Payment Instruments, Offerings, Service Components, Subscriptions, Service Instances, Role Assignments, Permits, Resources, Billing Statement Period Information, Billing Statement Payment Information, Billing Statement Line Items, Comments, and/or Settlement Information to name possible object functionality. The entities 1130-1154 can also interact with the SPS 1120 and/or between entities across a network 1170 and via a protocol 1174.

The protocol 1174 can include a Simple Object Access Protocol (SOAP), although as can be appreciated other protocols can be selected. SOAP facilitates a program running in one type of operating system to communicate with a program in the same or another kind of an operating system by utilizing Hypertext Transfer Protocol (HTTP) and/or XML as components for information exchange, as an example. An optional Partner Support Object (PSO) 1180 can be provided with the entities 1130-1154 to facilitate communications between entities and the SPS 1120. For example, the PSO 1180 can provide a helper interface for establishing connections to the SPS 1120 and/or provide connection pooling of objects to facilitate performance. The PSO 1180 generally exposes a single API such as a connect interface. After installing the PSO 1180, the respective entity 1130-1154 can utilize the PSO for authentication, authorization, and/or other communications, if desired.

Figure 11:
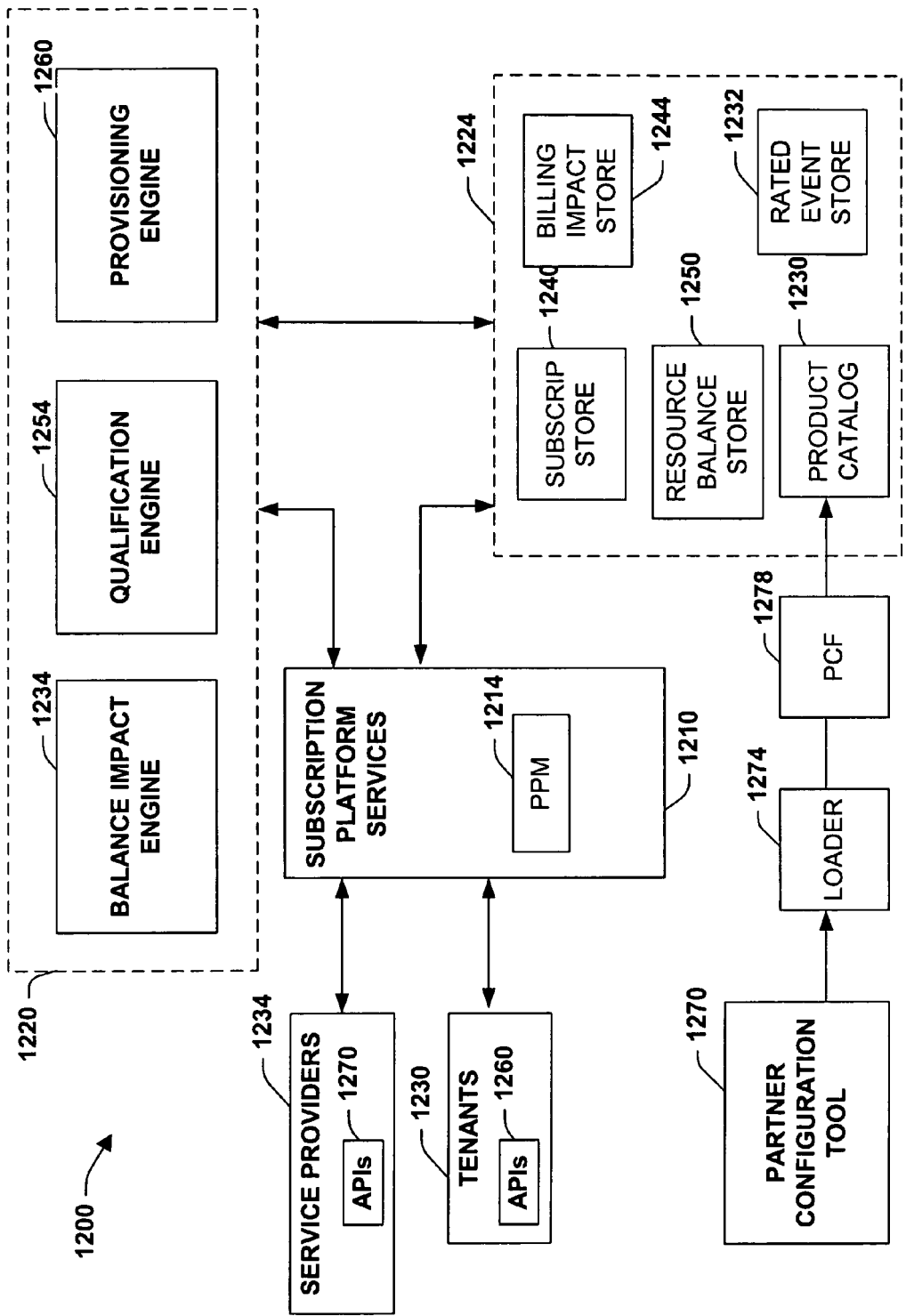
FIG. 11 is a schematic block diagram illustrating engine and data processing in accordance with an aspect of the present invention.

Referring now to FIG. 11, a system 1200 illustrates an event processing architecture in accordance with the present invention. The system 1200 can be organized into a multi-tier architecture that directs runtime communications with external parties through a Subscription Platform Services (SPS) layer 1210. The SPS 1210 includes a Partner Permissions Manager (PPM) 1214 that facilitates enforcement of per partner permissions at tier associated with a partner communicating with the system 1200. The PPM 1214 is employed to enforce a partner permissions model on a per transaction basis enabling respective partners with suitable permissions to modify individual subscription and service states. The partner permissions model describes rights associated with a registered partner (e.g., tenants and/or service providers) that define their ability to modify individual subscription, account, and/or service states within the system 1200.

The SPS 1210 coordinates processing by various engines 1220 within the system 1200 and generally controls writing and updating data into various data stores 1224. A product catalog 1230 is provided that can include a defined SQL Server database that stores the catalog of service component definitions, partner permissions, and/or offering meta data. The product catalog 1230 can also include rating, qualification, and/or service delivery rules associated with individual offerings. Additional features supported by the product catalog 1230 include service component registrations (e.g., component ID assignments, partner IDs, URLs, support information), cross-partner offerings including multi-service component offerings and cross partner bundles. The catalog 1230 can include globalized offerings according to a plurality of countries, languages, associated currencies, customs and taxes in addition to providing groups of offerings that map substantially any combination of services.

Offering information can also be stored in the product catalog 1230. This information can include base, upgrade, downgrade, renewal, add-on, and mutual exclusivity between services information. In addition, eligibility information relating to date of sale, partners, languages, countries, currencies, maximum ownership per accounts, and valid payment instruments can be provided. Other offering information relates to billing cycles (e.g., monthly, multi-month, 28 day, forward/arrears cycle billing). This can also include information relating to renewals such as automatic or confirmed renewals and information relating to grace periods for settling accounts. Other catalog items can include event to rule mapping entries that define a subset of rules to be executed in the occurrence of an associated event.

A balance impact rating engine 1234 processes an extensible set of rating rules and/or ratings events—from the product catalog 1230 and a rated event store 1232, respectively, in the context of a subscription and associated subscription events that can be stored in a subscription store 1240. This engine 1234 can process a plurality of balance impact events (e.g., events affecting payment and utilization of services) provided at the scale of multiple service providers, tenants, customers, and/or other entities. The balance impact events can be stored and processed in a billing impact store at 1244. A resource balances store 150 maintains an aggregate amount for respective accounts that result from processing of rating rules by the balance impact rating engine 1234. Balances can be "typed" to indicate a value for the units of service represented, and scoped to one or more service delivery rules. This can include processing currency and non-currency resources, and processing rating rules that respond to user driven events (UDE) such as purchase, cancellation, cycle, usage reports, convert to/from, renewal, suspend and reactivate, for example. In addition, ratable events can be partitioned according to periods and provide immediate settlements and/or settlement amounts aggregated per a selected payment instrument. It is noted that the engines 1220 and/or system 1200 components can be implemented in substantially any object model framework (e.g., COM, DCOM, CORBA, .NET).

A qualification engine 1254 evaluates the eligibility of an individual user to purchase, cancel, and/or convert online service subscriptions. This engine 1254 processes qualification rules (stored in the product catalog 1230) associated with a given offering, employing attributes of an end user profile and associated subscriptions, for example. A provisioning engine 1260 coordinates transactional processing of defined provisioning methods across common service providers in response to suitable events as provided in the subscription event model, described above. This engine 1260 facilitates accurate and timely delivery of services to an end user. Provisioning methods include the act of setting the state (e.g., setting a flag or condition based on non-payment of bills) required to deliver or prevent delivery of a specified service to a designated user of the service or services. The provisioning engine 1260 also controls the flow of communications to service providers 1234, tenants 1230, or other entity (not shown) that employ one or more APIs 1260, 1270 to respond to provisioning events.

A Partner Configuration Tool (PCT) 1270 and a Partner Configuration Loader 1274 can communicate to the product catalog 1230 through an out-of-band process, if desired. Communications should be in accordance with an administrator having suitable security credentials for configuring and/or loading product catalog data. The PCT 1270 can be implemented as a graphical user interface (GUI) tool to configure service delivery rules, offerings, qualification rules, and/or per tenant permissions in addition to other parameters. The Partner Configuration Loader 1274 loads one or more Partner Configuration Files (PCF) 1278 into multiple system environments facilitating shared development/testing—across partner's testing and deployment, into multiple production and pre-production environments. The Partner Configuration Loader 1274 also facilitates creation of a partner account within the system 1200 to provide a substantially secure transmission of protected data to a respective partner. A protecting key can be transmitted out of band, for example, in order to mitigate attempts at hacking the system 1200. The PCF 1278 can be a transient schema file that includes definitions of offerings and associated qualification, rating, service delivery rules and/or partner permissions in an XML format, if desired. This format can include design time attributes employed by the PCT 1270 and/or runtime attributes employed by the various engines 1220 in the system 1200.

It is to be appreciated that the systems, components, and/or processes described thus far and described below can be implemented as individual components or processes and/or can be combined in various combinations. In addition, one or more of the described components and/or processes can be combined in accordance with various other components and/or processes—including providing all components and/or processes in a single component, or combinations of components, if desired.

Figure 12:
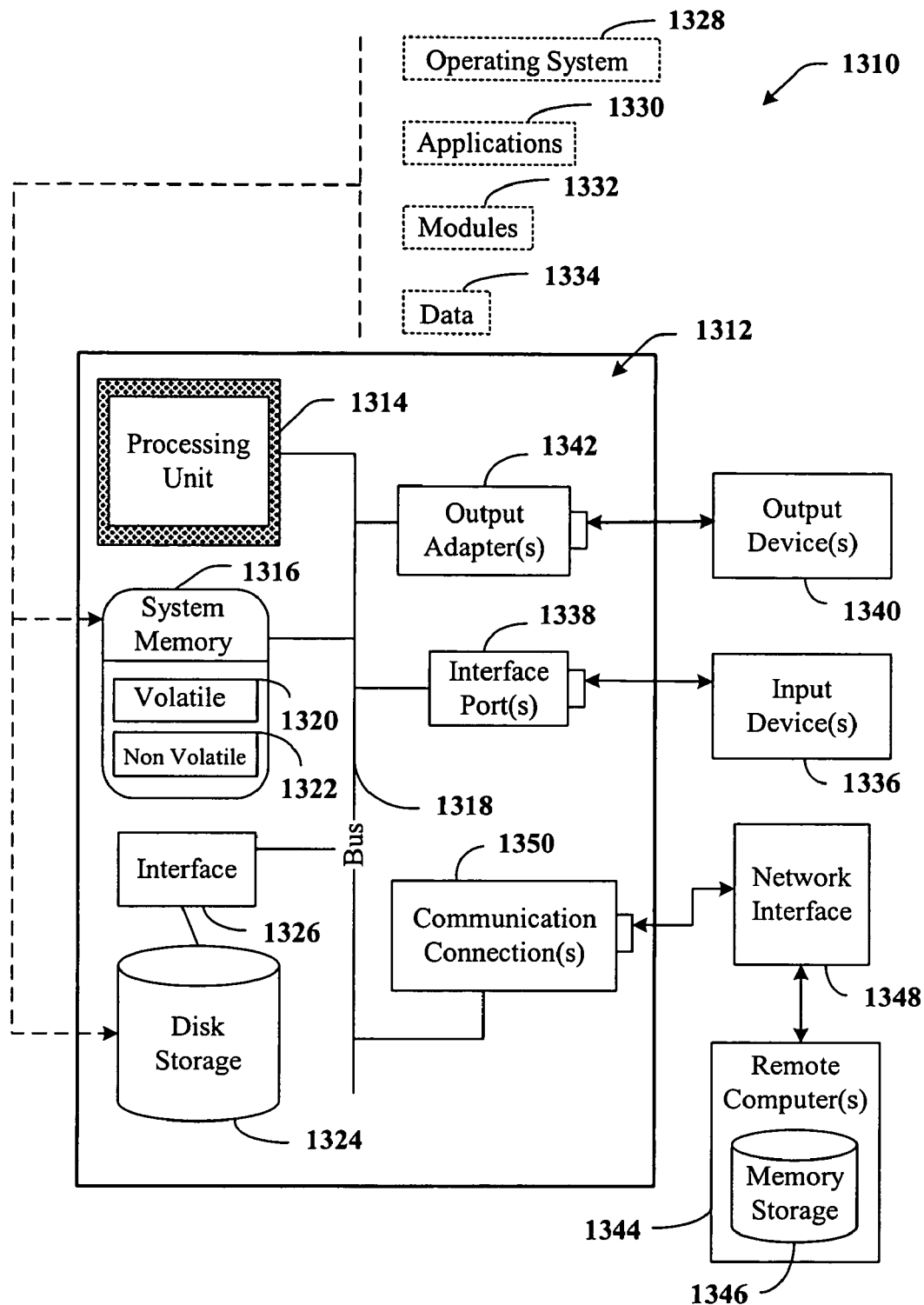
FIG. 12 is a schematic block diagram illustrating a suitable operating environment in accordance with an aspect of the present invention.

In order to provide a context for the various aspects of the invention, FIG. 12 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 12 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 12 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 13:
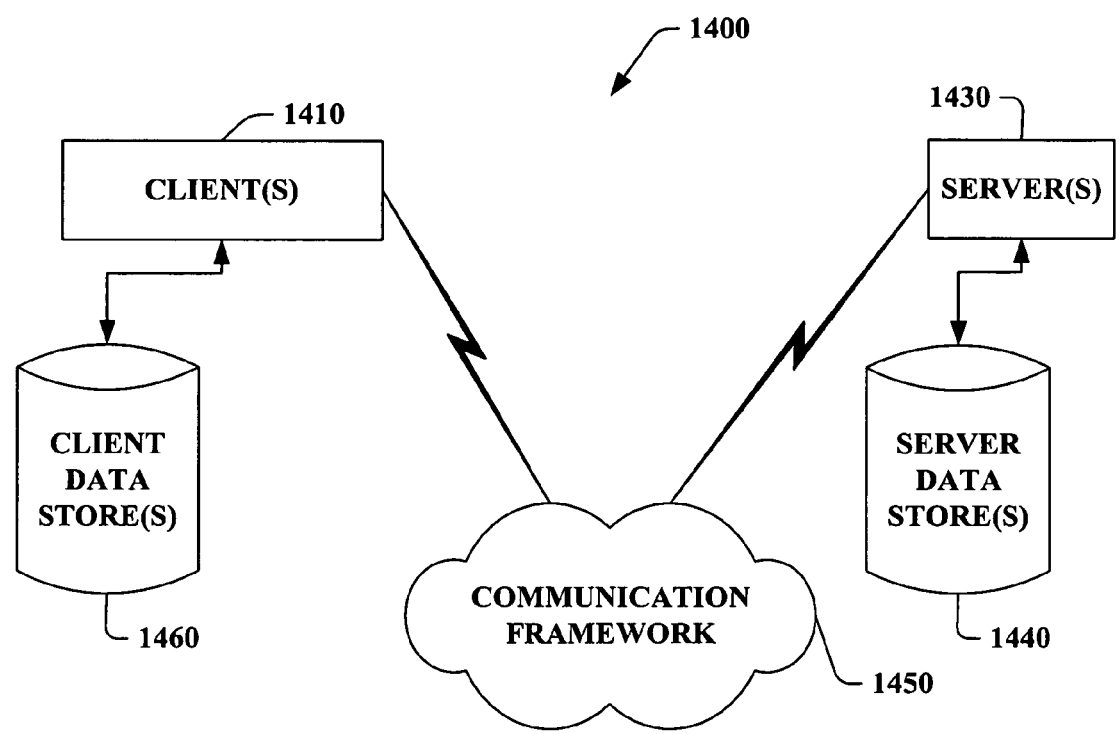
FIG. 13 is a schematic block diagram of a sample-computing environment with which the present invention can interact.

FIG. 13 is a schematic block diagram of a sample-computing environment 1400 with which the present invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the present invention, for example. One possible communication between a client 1410 and a server 1430 may be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. One or more non-transitory computer-readable media having computer-executable instructions embodied thereon that, when executed, provide a system that facilitates access to a plurality of shared software objects by disparate entities, the system comprising:
   a platform component executed by a computing device having a processor and a memory, that receives a request from a first entity to access one of the plurality of shared software objects, wherein the first entity is attempting to convert a subscription from a second type of a second entity to a first type of the first entity;
   a data store that stores security information on one or more classes of the plurality of shared software objects, wherein the security information on each of the one or more classes is inherited by one or more shared software objects in each class, and wherein the security information includes a security parameter that indicates whether the first entity is permitted to convert the subscription from the second type to the first type; and
   a verification component that employs the security information to verify that the first entity has permission to call an Application Programming Interface (API) for the one of the plurality of shared software objects to convert the subscription from the second type to the first type, wherein the verification component prevents the first entity from calling the API when the security parameter indicates that the first entity is not permitted to convert the subscription from the second type to the first type and the verification allows the first entity to call the API when the security parameter indicates that the first entity is permitted to convert the subscription from the second type to the first type.

2. The media of claim 1, wherein the verification component exposes the one of the plurality of shared software objects to the entity if permission exists.

3. The media of claim 1, wherein the verification component masks the one of the plurality of shared software objects from the entity if permission does not exist.

4. The media of claim 1, wherein the platform component further comprises a Subscription Platform Service to facilitate automated billing and provisioning of accounts.

5. The media of claim 1, wherein the verification component facilitates that the entity receive full access to Application Programming Interfaces (APIs) and/or objects for which there is a business need and partial or limited access to other APIs or business objects.

6. The media of claim 1, wherein the data store provides default or determined security information related to a class at least a portion of the one or more classes.

7. The media of claim 6, wherein the system further comprises a component to override the default security information with higher or different security options.

8. The media of claim 1, wherein the system further comprises a proxy tenant component having an intermediate entity that places calls into a subscription platform service on behalf of another entity and achieves access to selected objects of the plurality of shared software objects in order for the another entity to complete a subscription purchase.

9. The media of claim 1, wherein the system further comprises a management portal to facilitate authorization of information.

10. The media of claim 1, wherein the system further comprises a component to provide an explicit security mapping for one of the plurality of shared software objects.

11. The media of claim 1, wherein the system further comprises a component to enable an implicit security mapping from an explicitly mapped one of the plurality of shared software objects or to derive an implied security permission by utilizing related objects of the plurality of shared software objects.

12. The media of claim 1, wherein the verification component employs operating system identities to facilitate security authorization procedures.

13. The media of claim 1, wherein the system further comprises at least one of a sign-up API caller, an account management API caller, and a customer care API caller.

14. The media of claim 13, wherein the system further comprises at least one API related to at least one of a sign-up API group, an account management API group, a customer care API group, and an object designer API group.

15. The media of claim 1, wherein the system further comprises authorization logic that determines whether an API can access one or more of the plurality of shared software objects via an access rights set.

16. The media of claim 1, wherein the system further comprises at least one of a restricted audience offer, a conversion component, and a payment instrument component.

17. A method to facilitate security for subscription objects, comprising:
   storing one or more security options in a database, at least a portion of the one or more security options being related to an automated billing and provisioning system, wherein at least a portion of the one or more security options includes at least conversion of a subscription from a first type associated with a first tenant to a second type associated with a second tenant, and wherein one or more of the security options indicate allowability of the second tenant to convert the subscription type from the first type to the second type;
   assigning one or more of the security options to a class;
   inheriting the one or more security options assigned to the class by object members of the class;
   verifying that the second tenant has permission to call an Application Program Interface (API) for one or more of the object members of the class to convert the subscription type from the first type to the second type; and
   preventing the second tenant from calling the API when the security options indicate that the second entity is not permitted to convert the subscription type from the first type to the second type; or
   allowing the second tenant to call the API when the security options indicate that the second tenant is permitted to convert the subscription type from the first type to the second type.

18. The method of claim 17, further comprising at least one of explicitly and implicitly assigning one or more of the security options to the object members of the class.

19. The method of claim 17, further comprising automatically authorizing the API.

20. The method of claim 19, further comprising returning an error code if an authorization procedure fails.

21. The method of claim 19, further comprising analyzing a simple object access protocol request.

22. The method of claim 19, further comprising analyzing one or more security credentials.

23. The method of claim 22, further comprising employing a cache to process the credentials.

24. The method of claim 17, wherein the automated billing and provisioning system further comprises a Subscription Platform Service.

25. The method of claim 17, wherein at least a portion of the one or more security options is associated with default security parameters.

26. The method of claim 17, further comprising overriding the default security parameters with other security options of the one or more security options.

27. The method of claim 17, further comprising employing an intermediate proxy that places calls into a subscription platform service on behalf of another tenant.

28. One or more non-transitory computer-readable media having computer-executable instructions embodied thereon that, when executed, provide a system to facilitate business object security, comprising:
an authentication component executing on a computing device having a memory and a processor that authenticates a first entity attempting to access an online billing and service system, wherein the first entity is attempting to convert a subscription from a second type of a second entity to a first type of the first entity;
an authorization component that authorizes the first entity to convert the subscription from the second type of the second entity to the first type of the first entity upon verifying at least one security parameter, wherein the at least one security parameter is assigned to a class of objects and is inherited by objects of the class by one or more of explicitly and implicitly assigning the security parameter to the objects of the class, wherein the at least one security parameter is stored in a database and is accessible via an application program interface that is automatically authorized by analyzing one or more security credentials, and wherein the at least one security parameter indicates allowability of the first entity to convert the subscription from the second type to the first type.

* * * * *